United States Patent
Newell et al.

(10) Patent No.: US 11,290,425 B2
(45) Date of Patent: Mar. 29, 2022

(54) CONFIGURING NETWORK SECURITY BASED ON DEVICE MANAGEMENT CHARACTERISTICS

(71) Applicant: AirWatch LLC, Atlanta, GA (US)

(72) Inventors: Craig Farley Newell, Atlanta, GA (US); Sulay Shah, Atlanta, GA (US); Leung Tao Kwok, Cumming, GA (US); Adam Rykowski, Alpharetta, GA (US)

(73) Assignee: AirWatch LLC, Atlanta, GA (US)

( * ) Notice: Subject to any disclaimer, the term of this patent is extended or adjusted under 35 U.S.C. 154(b) by 711 days.

(21) Appl. No.: 15/012,185

(22) Filed: Feb. 1, 2016

(65) Prior Publication Data

US 2017/0222977 A1     Aug. 3, 2017

(51) Int. Cl.
| | |
|---|---|
| *H04L 29/06* | (2006.01) |
| *H04W 4/50* | (2018.01) |
| *H04W 12/082* | (2021.01) |
| *H04W 12/084* | (2021.01) |
| *H04W 12/088* | (2021.01) |

(52) U.S. Cl.
CPC ........ *H04L 63/0272* (2013.01); *H04L 63/029* (2013.01); *H04L 63/102* (2013.01); *H04W 4/50* (2018.02); *H04W 12/082* (2021.01); *H04W 12/084* (2021.01); *H04W 12/088* (2021.01)

(58) Field of Classification Search
CPC ............. H04L 63/0272; H04L 41/0803; H04L 63/029; H04L 63/10
See application file for complete search history.

(56) References Cited

U.S. PATENT DOCUMENTS

| | | | | |
|---|---|---|---|---|
| 6,466,932 | B1 * | 10/2002 | Dennis | G06F 21/10 707/694 |
| 8,560,699 | B1 * | 10/2013 | Theimer | H04L 63/0272 709/226 |
| 8,887,230 | B2 * | 11/2014 | Barton | H04L 41/046 726/1 |
| 8,904,477 | B2 * | 12/2014 | Barton | G06F 21/604 380/270 |
| 9,009,323 | B1 * | 4/2015 | Theimer | G06F 9/45558 709/226 |
| 9,521,117 | B2 * | 12/2016 | Barton | H04W 12/08 |
| 9,614,873 | B1 * | 4/2017 | Theimer | H04L 63/20 |

(Continued)

OTHER PUBLICATIONS

Fajardo etal "New Tunneling Capabilities for BGP/MPLS IP VPN in GNU/Linux," Seventh International Conference on Networking, IEEE Computer Society, pp. 324-329 (Year: 2008).*

*Primary Examiner* — Luu T Pham
*Assistant Examiner* — James J Wilcox
(74) *Attorney, Agent, or Firm* — Thomas | Horstemeyer LLP

(57) ABSTRACT

Disclosed are various examples for configuring network security based on device management characteristics. In one example, a specification of a set of network resources on an internal network is received from an administrator client. The set of network resources are those network resources that a particular application executed in client devices on an external network should be authorized to access. A gateway from the external network to the internal network is then configured to permit the particular application to have access to the set of network resources.

16 Claims, 7 Drawing Sheets

(56) References Cited

U.S. PATENT DOCUMENTS

| | | | | |
|---|---|---|---|---|
| 10,469,304 B1* | 11/2019 | Kempe | | H04L 63/0272 |
| 2003/0023587 A1* | 1/2003 | Dennis | | G06F 21/62 |
| 2003/0177221 A1* | 9/2003 | Ould-Brahim | | H04L 45/04 |
| | | | | 709/223 |
| 2004/0093595 A1* | 5/2004 | Bilange | | G06Q 30/0645 |
| | | | | 717/171 |
| 2004/0160903 A1* | 8/2004 | Gai | | H04L 63/105 |
| | | | | 370/254 |
| 2004/0203681 A1* | 10/2004 | Ross | | H04L 67/04 |
| | | | | 455/418 |
| 2005/0129019 A1* | 6/2005 | Cheriton | | H04L 63/101 |
| | | | | 370/392 |
| 2005/0138204 A1* | 6/2005 | Iyer | | H04L 63/164 |
| | | | | 709/242 |
| 2006/0013191 A1* | 1/2006 | Kavanagh | | H04L 63/102 |
| | | | | 370/349 |
| 2006/0167858 A1* | 7/2006 | Dennis | | H04L 63/102 |
| 2006/0174121 A1* | 8/2006 | Omae | | H04W 12/084 |
| | | | | 713/172 |
| 2006/0184999 A1* | 8/2006 | Guichard | | H04L 63/0428 |
| | | | | 726/3 |
| 2006/0198368 A1* | 9/2006 | Guichard | | H04L 63/0272 |
| | | | | 370/389 |
| 2006/0212924 A1* | 9/2006 | Xie | | H04L 63/102 |
| | | | | 726/1 |
| 2008/0040775 A1* | 2/2008 | Hoff | | H04L 63/20 |
| | | | | 726/1 |
| 2008/0072033 A1* | 3/2008 | McAlister | | H04L 63/0464 |
| | | | | 713/153 |
| 2008/0127327 A1* | 5/2008 | Carrasco | | H04L 63/0272 |
| | | | | 726/15 |
| 2009/0300350 A1* | 12/2009 | Gai | | H04L 63/0272 |
| | | | | 713/160 |
| 2010/0138650 A1* | 6/2010 | Kang | | H04L 63/065 |
| | | | | 713/153 |
| 2010/0293610 A1* | 11/2010 | Beachem | | H04W 12/088 |
| | | | | 726/15 |
| 2012/0117620 A1* | 5/2012 | Cassidy | | H04N 21/2543 |
| | | | | 726/3 |
| 2012/0131643 A1* | 5/2012 | Cheriton | | H04L 63/08 |
| | | | | 726/3 |
| 2014/0007192 A1* | 1/2014 | Qureshi | | G06F 21/10 |
| | | | | 726/3 |
| 2014/0108793 A1* | 4/2014 | Barton | | G06F 21/6218 |
| | | | | 713/165 |
| 2014/0109174 A1* | 4/2014 | Barton | | H04W 12/08 |
| | | | | 726/1 |
| 2014/0109175 A1* | 4/2014 | Barton | | H04L 63/0807 |
| | | | | 726/1 |
| 2014/0109176 A1* | 4/2014 | Barton | | G06F 3/0481 |
| | | | | 726/1 |
| 2014/0109214 A1* | 4/2014 | Siu | | H04L 63/0272 |
| | | | | 726/15 |
| 2014/0150049 A1* | 5/2014 | Kwon | | H04W 12/12 |
| | | | | 726/1 |
| 2014/0162614 A1* | 6/2014 | Lindeman | | H04W 12/00 |
| | | | | 455/414.1 |
| 2014/0173700 A1* | 6/2014 | Awan | | H04L 63/107 |
| | | | | 726/4 |
| 2014/0233564 A1* | 8/2014 | Lue | | H04L 12/4645 |
| | | | | 370/392 |
| 2015/0012998 A1* | 1/2015 | Nellikar | | H04L 63/0245 |
| | | | | 726/13 |
| 2015/0172920 A1* | 6/2015 | Ben Ayed | | H04L 63/0492 |
| | | | | 713/172 |
| 2015/0281322 A1* | 10/2015 | Dingwell | | G06F 9/45558 |
| | | | | 705/26.82 |
| 2015/0365512 A1* | 12/2015 | MacKenzie | | H04L 63/104 |
| | | | | 455/420 |
| 2016/0087854 A1* | 3/2016 | Jayanti Venkata | | |
| | | | | H04L 63/0823 |
| | | | | 709/224 |
| 2016/0182567 A1* | 6/2016 | Sood | | H04L 63/0272 |
| | | | | 726/1 |
| 2016/0277359 A1* | 9/2016 | Karunakaran | | H04L 61/2514 |
| 2017/0064749 A1* | 3/2017 | Jain | | H04L 61/256 |
| 2017/0104755 A1* | 4/2017 | Arregoces | | H04L 63/10 |
| 2017/0118173 A1* | 4/2017 | Arramreddy | | H04L 63/20 |
| 2017/0171186 A1* | 6/2017 | Purushothaman | | H04L 63/104 |
| 2017/0201491 A1* | 7/2017 | Schmidt | | H04L 65/1069 |
| 2017/0201588 A1* | 7/2017 | Schmidt | | H04L 63/0876 |

* cited by examiner

CONFIGURING NETWORK SECURITY BASED ON DEVICE MANAGEMENT CHARACTERISTICS

BACKGROUND

Most users are now familiar with the concept of an application catalog, which can be referred to as an "app store." When users wish to install an application, their first thought is to access a program or web site corresponding to an "app store." An application catalog is a centralized interface through which users can browse information about various applications and easily launch downloads and installations of selected applications. Application catalogs are typically administered by a single organization, which can establish rules and security procedures to be followed in order for developers to participate. This central administration can provide a level of trustworthiness and comfort for users who are installing applications. In many cases, application catalogs are integrated with a shared payment workflow of the administering organization to simplify payments for applications. While popularized beginning with smartphones and tablets, application catalogs are increasingly relied upon for distributing applications for desktop and laptop computers as well.

In addition to the familiar application catalogs that are made available to the general public, organizations can provide private application catalogs for their employees or members. For example, an organization can choose to include only applications that have met security screening guidelines for use within the computer network of the organization. The application catalog can also manage application licensing for the organization. Rather than the user paying for a specific download of an application as is the case with public application catalogs, a private application catalog can track installations to comply with site licensing requirements or other previously negotiated licensing contracts. Such private application catalogs can be made available for devices managed through mobile device management (MDM). Such devices can be owned by the organization or the users themselves in a bring-your-own-device (BYOD) environment.

One issue with allowing a user to download an application from a private application catalog is that a user typically receives access to all resources on the network. For example, a large corporation can include multiple sales organizations focused on different products or geographic regions. The corporation can provide a sales application to its sales employees to track sales for their product or region. However, all of the sales employees who download the application typically would receive access to all sales documents regardless of that particular user's responsibilities, which can expose sensitive corporation information throughout the organization. Traditional approaches to restricting access, such as an administrator setting permissions for every user on every document or creating different custom applications for each corporate group, cannot scale to organizations with many employees and large numbers of documents and resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
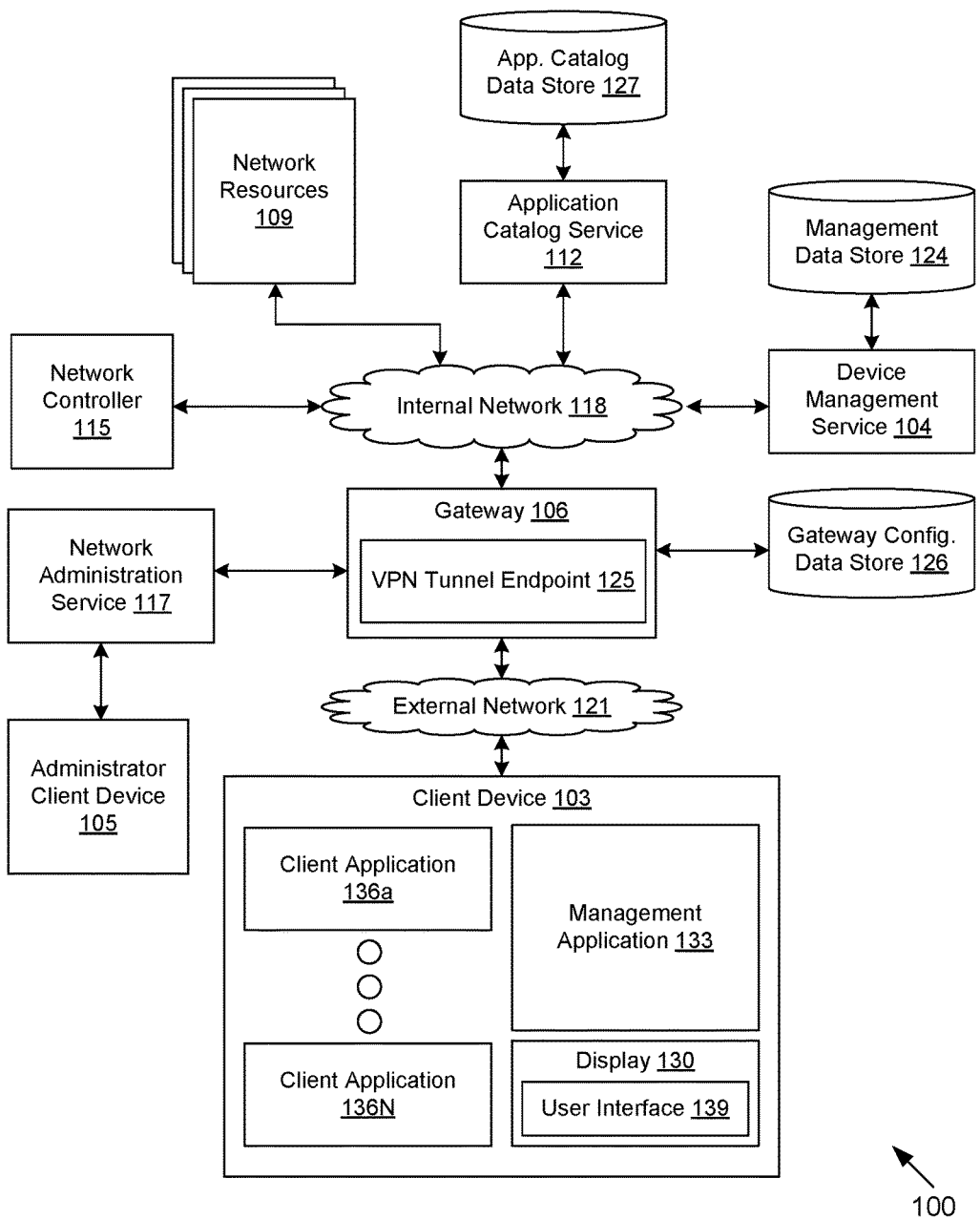
FIG. 1 is a drawing of a networked environment according to various examples of the disclosure.

The present disclosure relates to configuring security for a network on a per-application basis based on device management characteristics. As will be described, network resources on an organization's internal network can be grouped into a variety of security groups. Access to the network resources in a particular security group can be conditioned based on several factors. For example, different applications can be given access to different security groups. Thus, the identity of a particular application can be a factor in providing access to the network resources in a particular security group. Other device management attributes, such as a location of a client device, a user of the client device, an operating system of the client device, a jailbreak status of the client device, can also be used to grant or deny access to a particular security group.

One approach to implementing security groups in an organization's network uses micro-segmentation of the network. A microsegment can correspond to a virtual network where resource permissions are enforced by adding a resource to the microsegment or removing a resource from the microsegment. For example, a spreadsheet containing last quarter's sales data for the organization can be included in a microsegment accessible by management users but not in a microsegment accessible by customer service users. The microsegment security model either replaces or functions in concert with security models that manage access at each resource. A separate network microsegment can, in some examples, be created for at least every grouping of network resources that are to be accessed.

Client applications can be executed on client devices that are not physically coupled to the internal network of the organization. These client devices can be mobile devices owned by the user. In order to provide access to network resources of the organization, the organization can require that the client devices be managed by the organization. Through a device management platform, network traffic between a client application and network resources of the organization can be routed through a virtual private network (VPN) tunnel to a gateway to the internal network.

In various examples of the present disclosure, this gateway or tunnel endpoint can be configured to enforce various rules to permit or deny access to network resources and/or security groups. The rules can be based on the particular application and/or other device management attributes. In some examples, the gateway can assign a network address meeting certain predefined criteria to a tunnel endpoint corresponding to a particular application. The internal network is configured to permit the network address to access network resources in a security group. Conversely, if the application and/or other device management attributes do not meet the predefined criteria, the gateway can assign a different network address meeting different predefined criteria to the tunnel endpoint. This can allow access to an error message or other default network resource.

With reference to FIG. 1, shown is a networked environment 100 according to various examples. The networked environment 100 includes a client device 103, a device management service 104, an administrator client device 105, a gateway 106, a plurality of network resources 109, an application catalog service 112, a network controller 115, a network administration service 117, an internal network 118, and an external network 121. The gateway 106, the device management service 104, the application catalog service 112, the network resources 109, the network controller 115, and the network administration service 117 can be coupled to the internal network 118, while the gateway 106 and the client device 103 can be coupled to the external network 121. The administrator client device 105 can be in data communication with the network administration service 117 by way of the internal network 118 or through another network. Each of the internal network 118 and the external network 121 can include, for example, wide area networks (WANs), local area networks (LANs), wired networks, wireless networks, other suitable networks, or any combination of two or more networks. For example, the networks can include satellite networks, cable networks, Ethernet networks, and other types of networks.

The device management service 104, the gateway 106, the network resources 109, the application catalog service 112, the network controller 115, and the network administration service 117 can include, for example, a server computer, a network device, or any other system providing computing capabilities. Alternatively, the device management service 104, the gateway 106, the network resources 109, the application catalog service 112, the network controller 115, and the network administration service 117 can employ multiple computing devices that can be arranged, for example, in one or more server banks, computer banks, or other arrangements. The computing devices can be located in a single installation or can be distributed among many different geographical locations. For example, the device management service 104, the gateway 106, the network resources 109, the application catalog service 112, the network controller 115, and the network administration service 117 can include multiple computing devices that together form a hosted computing resource, a grid computing resource, or any other distributed computing arrangement.

In some cases, the device management service 104, the gateway 106, the network resources 109, the application catalog service 112, the network controller 115, and the network administration service 117 can operate as at least a portion of an elastic computing resource where the allotted capacity of processing, network, storage, or other computing-related resources can vary over time. The device management service 104, the gateway 106, the network resources 109, the application catalog service 112, the network controller 115, and the network administration service 117 can also include or be operated as one or more virtualized computer instances. Generally, the device management service 104, the gateway 106, the network resources 109, the application catalog service 112, the network controller 115, and the network administration service 117 can be operated in accordance with particular security protocols such that they are considered trusted computing environments. The device management service 104, the gateway 106, the network resources 109, the application catalog service 112, the network controller 115, and the network administration service 117 can be located remotely with respect to the client device 103.

The device management service 104 can manage or oversee the operation of multiple client devices 103. In some examples, an enterprise, such as one or more companies or other organizations, can operate the device management service 104 to oversee or manage the operation of the client devices 103 of employees, contractors, or other users within an enterprise environment. In this sense, the client devices 103 can include managed devices that are managed by the device management service 104.

The client device 103 can be enrolled as a managed device with the device management service 104 through APIs provided by the operating system. The enrollment process can include authentication of a user's credentials. Upon authentication of a user's credentials by the device management service 104, the client device 103, using device management APIs of the operating system, can enroll the client device 103 as a managed device so that various management functions can be performed by the device management service 104.

Examples of management functions can include commands to erase certain data from the client device 103, commands to install certain applications or application updates, commands to lock a client device 103 or activate a display lock feature, a command to remotely perform a factory reset of the client device 103, or other management functions. Additionally, data can be securely transmitted through a secure communications channel to the client device 103 or applications executed by the client device 103.

Additionally, the operating system of the client device 103 can also provide the ability to create access-restricted storage that is associated with particular applications installed on the client device 103. Access-restricted storage can be associated with multiple applications that are installed on the client device 103 through the secure communications channel. In some scenarios, applications that are signed by a common certificate can be provided access to the access-restricted storage of each other, whereas applications that are not signed by the certificate do not have access to the access-restricted storage of other applications. Additionally, the device management service 104 can transmit data to the client device 103 over the secure communications channel that can be stored in the access-restricted storage such that it is accessible by certain applications and inaccessible to other applications that are installed on the client device 103.

The device management service 104 can also facilitate ensuring that client devices 103 that are administered by the device management service 104 are operating in compliance with various compliance rules. In one scenario, the device management service 104 can issue management commands that instruct a client device 103 to take a particular action with respect to a compliance rule. For example, if a client device 103 is designated as lost or stolen, the device management service 104 can issue a command instructing the client device 103 to erase data and applications that were previously sent to the client device 103 through the secure communications channel or other communication links and otherwise stored on the client device 103. The device management service 104 can also obtain data from a third party computing environment, such as an application, a security code, authentication token, or other data. As another example, if the device management service 104 determines that a client device 103 has violated a compliance rule with respect to having unauthorized modifications or unauthorized applications installed on the client device 103, the device management service 104 can issue a command instructing the client device 103 to erase data and applications stored on the client device 103. As a further example, the device management service 104 can also issue a command instructing the client device 103 to activate a display lock of the client device 103 that requires a user to enter a personal identification number (PIN) in order to use the client device 103.

The data stored in the management data store 124 and available to the device management service 104 includes, for example, authentication data, compliance rules, device data, and potentially other data. The authentication data can include data used to verify one or more security credentials presented by a user for authentication. To this end, secure certificates can be stored and then be made available to the client device 103 that has been authenticated in order to encrypt the secure communications channel and/or for other functions.

Within the context of an enterprise, compliance rules include one or more rules that, when violated, can cause the device management service 104 to issue a management command. Compliance rules can include a list of unauthorized hardware functions, software functions, or applications that potentially pose a threat to enterprise data or to the use of enterprise applications. As noted above, if client device 103 falls out of compliance with one or more compliance rules, a management command can be transmitted to the client device 103 instructing the client device 103 to perform one or more actions specified by the compliance rule. Alternatively, a compliance rule can also reside on the client device 103, which can self-enforce compliance rules. The management data store 124 can also include user account data. User account data can include information with which a user account can be authenticated, such as user credentials. User account data can also include data such as email, contact, calendar data, documents, files or other data that is associated with a user account.

Device data can represent data stored in the management data store 124 that is associated with client devices 103 that are enrolled with the device management service 104 as managed devices. Device data can include a unique device identifier associated with the client device 103, device policies that are associated with a particular client device 103, status information associated with a particular client device 103, and other data that facilitates management of the client device 103 by the device management service 104. Device data can also include user data that is synchronized with a particular client device 103. A user account can be associated with multiple client devices 103. Different client devices 103 associated with a user account can have different user account data stored thereon. For example, a user's smartphone can have a certain number of documents or email messages stored on the device, whereas the user's laptop or tablet can have varying amounts of types of user account data stored on the device.

The gateway 106 establishes network tunnels with client devices 103 through the external network 121 in order to provide the client devices 103 with a secure connection to the network resources 109 coupled to the internal network 118. In other words, the gateway 106 restricts the access of the client device 103 to devices coupled to the internal network 118 by requiring the client device 103 to first establish a secure tunnel with the gateway 106. The secure tunnels can terminate at a virtual private network (VPN) tunnel endpoint 125 of the gateway 106. A tunnel uses a tunnel header to encapsulate the packets from one type of protocol in the datagram of a different protocol. Tunnels in some examples use point-to-point tunneling protocol (PPTP) to encapsulate internet protocol (IP) packets over a public network, such as the Internet. A tunnel encrypts the payload of its packets with one or more keys or secure certificates. This allows packets to be exchanged between the client device 103 and the gateway 106 securely. In some examples, the gateway 106 (1) encapsulates and encrypts packets sent from the internal network 118 to the client device 103 with a tunnel packet header, and (2) decapsulates tunnel headers from the packets that it receives from the client device 103, and decrypts these packets, before forwarding the packets to network elements of the internal network 118.

When a client device 103 tries to establish a tunnel connection with the gateway 106, the gateway 106 in some examples passes the credential set that it gets from the client device 103 to the device management service 104 in order to authenticate the request. In authenticating the credential set, the device management service 104 in some examples provides one or more mobile device management (MDM) attributes for the client device 103, the user (of the client device 103), and/or the application (executing on the client device 103) requesting the connection.

The gateway 106 associates the provided MDM attribute(s) with the data messages that it subsequently received from the client device 103 through the established connection. Also, once the connection is established, the client device 103 embeds one or more MDM attributes for the data messages that it sends in the tunnel header in some embodiments. In some examples, the gateway 106 aggregates the MDM attributes that it receives from the device management service 104 and the client device 103 into one set of MDM attributes that it associates with the data messages transmitted by the client device 103 through its connection.

Based on the associated MDM attribute set, the gateway 106 performs one or more operations on the data messages that it receives from the client device 103 through the tunnel. The associated MDM attribute set provides the context for processing the data processing rules that the gateway 106 enforces in some examples. In some examples, the rule identifiers of the rules are not only defined by reference to MDM attribute values but also by the flow identifier values (e.g., the L2-L4 header values) of the data message flows.

In one example, the gateway 106, as configured by data in the gateway configuration data store 126, assigns a network address meeting predefined criteria (e.g., within a certain subnetwork) based on the associated MDM attribute set. The assigned network address can be permitted access to certain network resources 109 on a micro-segment of the internal network 118. As an example, the gateway 106 can assign an internet protocol (IP) address in the range "10.123.1.x" to a VPN tunnel endpoint 125 to enable the VPN tunnel endpoint 125 to communicate with network resources 109 corresponding to sales department servers. As another example, the gateway 106 can assign an IP address in the range "10.124.1.x" to a VPN tunnel endpoint 125 to enable the VPN tunnel endpoint 125 to communicate with network resources 109 corresponding to accounting department servers.

The network resources 109 provide corresponding services for client applications. The services can include, for example, social networking services, email services, voice communication services, enterprise information management services, productivity services, game services, databases, and other services. The network resources 109 can communicate with the client device 103 over the external network 121 and the internal network 118 by way of hypertext transfer protocol (HTTP), simple object access protocol (SOAP), representational state transfer (REST), and/or other protocols.

The application catalog service 112 is executed to provide application catalog functionality to client devices 103. In particular, the application catalog service 112 is configured to generate a listing of applications that are available to be deployed (e.g., installed, configured) to client devices 103 that are managed by the organization. In this regard, the application catalog service 112 can encode one or more user interfaces that present the application catalog for rendering on the client device 103. Data relating to these user interfaces can be transferred to the client device 103 over the external network 121. For example, the data can correspond to a hypertext markup language (HTML) code, images, extensible markup language (XML) code, JavaScript object notation (JSON) data, yet another markup language (YAML) data, or other user interface data.

The application catalog service 112 can be aware of distinct security groups within the organization. Security groups can allow access to particular subsets of network resources 109 while denying access to other network resources 109. The security groups can, for example, correspond to roles of a user within the organization. When the application is deployed on the client device 103, the application is able to access network resources 109 in a selected or specified security group, but not other network resources 109 of the internal network 118. In another example, the system can automatically detect a user's security group based on information identifying the user or the user's device. For example, the MDM attributes used when accessing an application catalog can also be used to look up a user's assigned security group within the management data store 124. In one scenario, multiple instances of a particular application can be featured in a listing of applications in the application catalog, where each of the instances can correspond to a different security group.

The data stored in the application catalog data store 127 and available to the application catalog service 112 includes application packages for deployment to the client devices 103, configuration data that indicates the available security groups (or roles within the organizations) on a per-application basis, and potentially other data.

The network controller 115 is executed to control the gateway 106 and elements within the internal network 118 (e.g., firewalls, routers, bridges, intrusion detection systems, network address translation systems, port address translation systems) in order to implement virtual network segments within the internal network 118 for applications of the client device 103 to access a particular set of network resources 109. A virtual network segment, or micro-segment, can be established for each set of network resources 109 such that network traffic from a VPN tunnel endpoint 125 is routable in the internal network 118 only to an approved set of network resources 109 and not to other network resources 109. A given network resource 109 can accessible through a plurality of different virtual network segments.

The network administration service 117 can facilitate configuration of the operation of the gateway 106, the application catalog service 112, the network controller 115, and other services by the administrator client device 105. To this end, the network administration service 117 can cause a series of user interfaces to be rendered by the administrator client device 105. The user interfaces can correspond to a web portal rendered by a browser or to native application screens rendered by a native application executed in the administrator client device 105. For example, the network administration service 117 can provide an application programming interface (API) for communication with a native application executed in the administrator client device 105. The administrator client device 105 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability.

Figure 2:
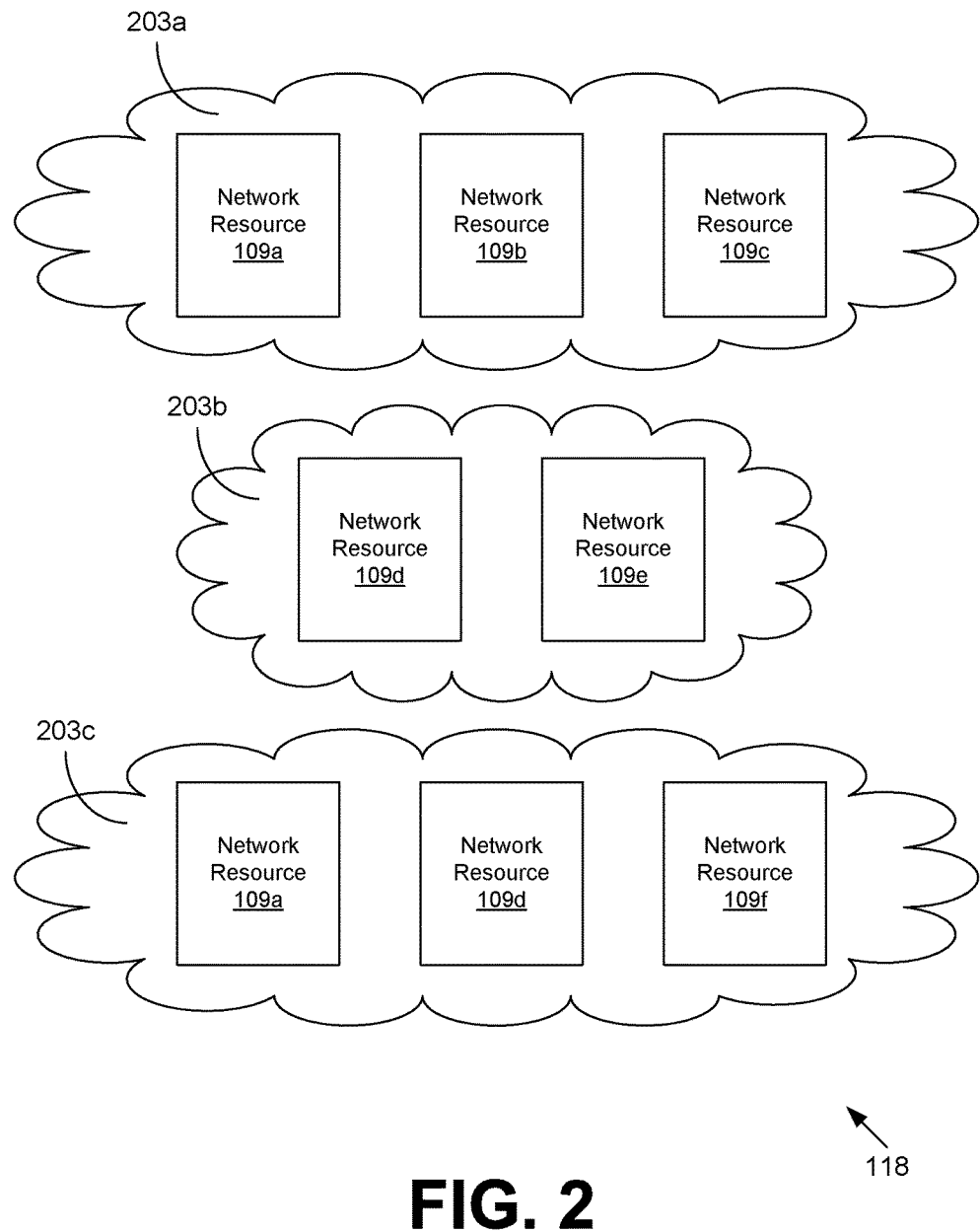
FIG. 2 is a drawing of an example of an internal network with multiple virtual network segments, which can each be associated with different security groups.

Referring now to FIG. 2, shown is one example of an internal network 118 with multiple virtual network segments 203a, 203b, 203c, which can each be associated with different security groups. In this example, the virtual network segment 203a includes network resource 109a, network resource 109b, and network resource 109c. Virtual network segment 203b includes network resources 109d and 109e. Virtual network segment 203c includes network resources 109a, 109d, and 109f. It is noted that the network resource 109a is accessible through multiple virtual network segments 203a and 203c. Similarly, the network resource 109d is accessible through virtual network segments 203b and 203c. This illustrates that a different combination of resources can be made available through individual virtual network segments 203. Examples of network resources 109 can include links to file repositories or portions thereof, particular servers, particular accounts on a server, particular virtual machines or particular data stored by a virtual machine, and particular computing devices.

Referring back to FIG. 1, the client device 103 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 103 can include a display 130 that includes, for example, one or more devices such as liquid crystal display (LCD) displays or other types of display devices. The client device 103 can also be equipped with networking capability or networking interfaces, including a localized networking or communication capability such as a near-field communication (NFC) capability, radio-frequency identifier (RFID) read and/or write capability, a microphone and/or speaker, or other localized communication capability.

The client device 103 can execute various applications, such as a management application 133, a plurality of client applications 136a . . . 136N, and other applications, services, or processes. The management application 133 can receive security credentials from a user and authenticate with the device management service 104. Although described as an application, it is understood that the management application 133 can be an integral component of an operating system of the client device 103. The client applications 136 correspond to a variety of applications that are employed to access services provided by the network resources 109. The client applications 136 can include a web view component, whereby the client applications 136 interact with the network resources 109 to obtain network content by way of hypertext transfer protocol (HTTP) requests and responses. Alternatively, the client applications 136 can communicate with the network resources 109 using user datagram protocol (UDP), real-time transport protocol (RTP), and/or other protocols. The client applications 136 and the management application 133 can individually render a respective user interface 139 upon the display 130.

Figure 3:
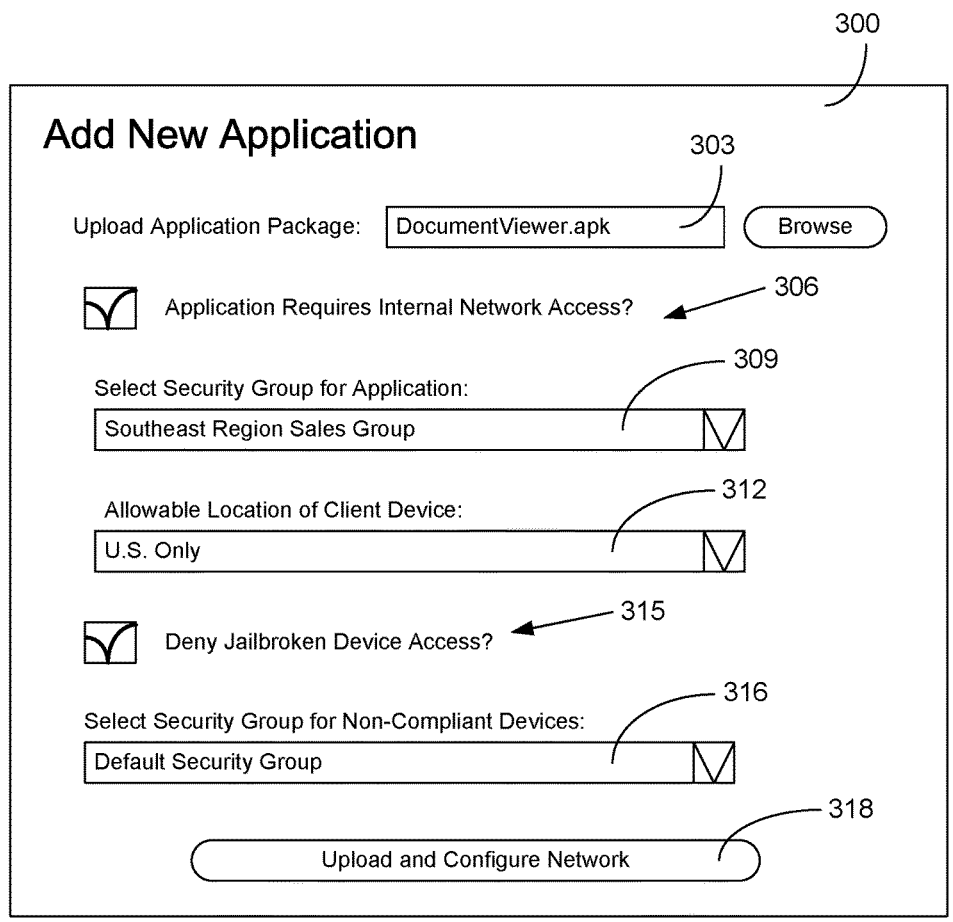
FIG. 3 is a drawing of an example user interface rendered by an administrator client device in the networked environment of FIG. 1.

Continuing now to FIG. 3, shown is one example of a user interface 300 rendered by an administrator client device 105 in the networked environment 100 (FIG. 1). The user interface 300 facilitates configuration of a client application 136 to be added to an application catalog served by an application catalog service 112. The user interface 300 can be generated by the network administration service 117, and data encoding the user interface 300 can be sent to the administrator client device 105 for rendering.

The user interface 300 includes one or more application upload components 303 that allow an administrator user to specify a given application package to be uploaded, downloaded, or otherwise imported to the application catalog. For example, an administrator user can navigate to a local file on the administrator client device 105 corresponding to an application package (e.g., "DocumentViewer.apk") using a file picker, and then upload the package to the network administration service 117. Alternatively, the administrator user can specify a uniform resource locator (URL) indicating an internal or external location of the application package. In some examples, the user can specify additional information about the application package, such as title, version, unique identifier, and/or other metadata. In some cases, this metadata can be extracted from the application package itself.

The user interface 300 can include a selection component 306 such as a checkbox that allows the administrator user to indicate whether the client application 136 should be permitted to have access to the internal network 118. If the client application 136 should not be permitted to have access to the internal network 118, further configuration for network security purposes can be unnecessary. However, if the client application 136 is to be permitted access to the internal network 118, a selection component 309 such as a drop-down box can allow the administrator user to specify one or more security groups (or microsegments or virtual network segments) to which the client application 136 will have access. In this example, the security group of "Southeast Region Sales Group" is selected, and this security group can correspond to a predefined set of network resources 109 to which the client application 136 should have access.

The user interface 300 can also include a selection component 312 such as a drop-down box that allows the administrator user to specify one or more allowable locations (or restricted locations) of the client device 103 for permitting or denying network access to the client application 136 based on the location of the client device 103. For example, the administrator user can specify that the client application 136 should have access to network resources 109 of the security group within the United States only. Alternatively, the administrator user can specify that the client application 136 cannot have access to the network resources 109 of the security group when the client device 103 is within a certain country.

The user interface 300 can also include a selection component 315 such as a checkbox that, when selected, denies client devices 103 that are jailbroken or rooted from having access to the network resources 109 of the security group. Although the user interface 300 includes components allowing specification of locations and jailbreak status, it is understood that user interfaces 300 can include any number of user interface components that facilitate specification of rule-based criteria to allow or deny network access based on MDM attributes, such as user identity, device identity, operating system version, application version, and other attributes.

The user interface 300 can also include a selection component 316 such as a drop-down box that allows an administrator user to specify a fallback or default security group of network resources 109 to which the client application 136 should have access if the client device 103 is in a non-compliant state relative to the MDM attributes. For example, if a client device 103 is jailbroken, and jailbroken devices are not permitted access to network resources 109 of a particular security group, the jailbroken client device 103 can still access a default network resource 109 in order to provide an error message or document through the client application 136. This can improve the end-user experience as compared to being unable to make a network connection. Finally, a submit component 318 such as a button can be provided in the user interface 300 such that, when the submit component 318 is selected, the application package can be transferred and the network administration service 117 can receive the network configuration parameters specified by the administrator user.

Figure 4:
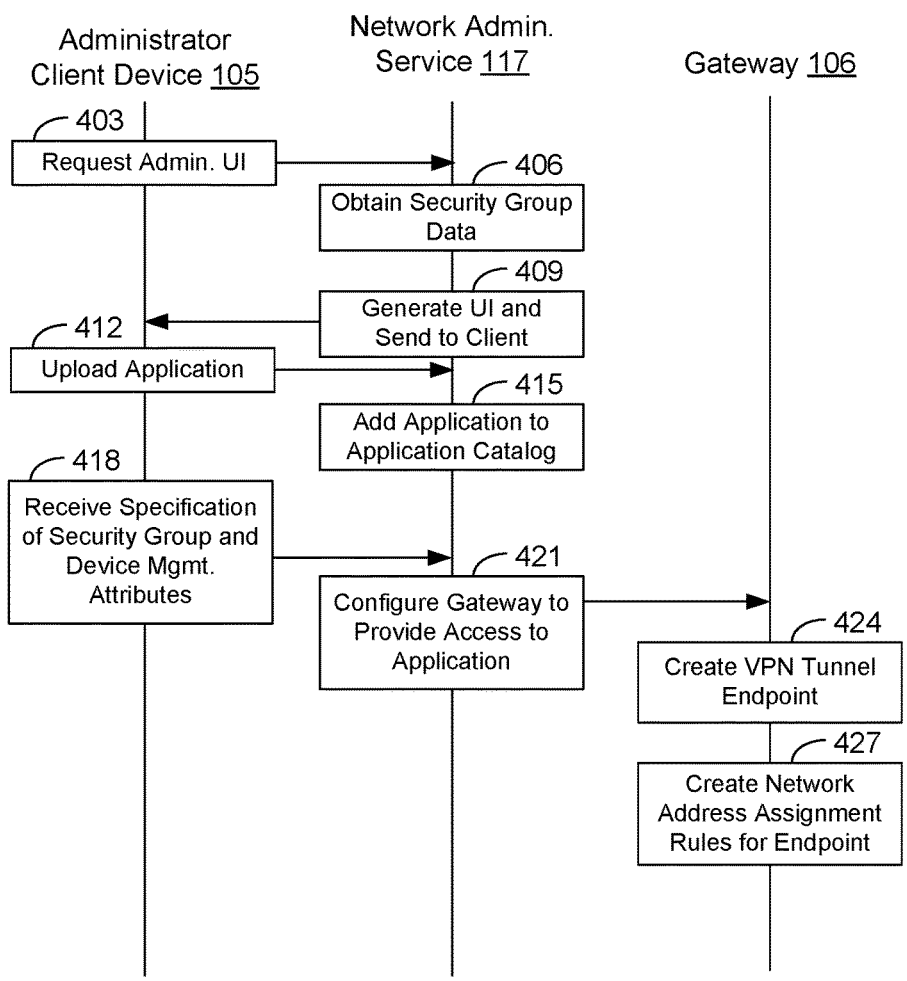
FIGS. 4 and 5 are sequence diagrams illustrating example component interactions according to various examples of the present disclosure.

Moving on FIG. 4, shown is a sequence diagram 400 illustrating one example of interaction between an administrator client device 105, a network administration service 117, and a gateway 106. Functionality attributed to each of the administrator client device 105, the network administration service 117, or the gateway 106 can be implemented in fewer processes or application or in additional processes or applications. The separation or segmentation of functionality as discussed herein is presented for illustrative purposes only.

Beginning with step 403, the administrator client device 105 requests an administration user interface from the network administration service 117 in order to manage the application catalog and/or network security on the internal network 118. At step 406, the network administration service 117 obtains security group data from a data store (e.g., the gateway configuration data store 126). For example, the internal network 118 can be preconfigured with a number of micro-segments, or sets of network resources 109 on separate virtual network segments. Each of these virtual network segments can be said to correspond to a separate security group. In some cases, a separate security group can be established for each grouping of roles within an organization. The security group data can include a mapping of security groups to predefined network address ranges or network address selection criteria.

At step 409, the network administration service 117 generates the user interface and sends data encoding the user interface to the administrator client device 105. For example, the data encoding the user interface can take the form of hypertext markup language (HTML), extensible markup language (XML), user interface image data, or other data. The user interface 300 of FIG. 3 corresponds to an exemplary administration user interface.

At step 412, the administrator client device 105 uploads an application package for a client application 136 to the network administration service 117. Alternatively, the administrator client device 105 can provide a uniform resource locator (URL) from which the application package can be obtained. At step 415, the network administration service 117 adds the client application 136 to the application catalog. The network administration service 117 can store the application package directly in the application catalog data store 127, or the network administration service 117 can cause the application catalog service 112 to import the application package into the application catalog. Although uploading of a client application 136 is discussed with respect to steps 412 and 415, in some scenarios the client application 136 can already be deployed on the client devices 103.

At step 418, the administrator client device 105 receives a specification of a security group and/or other device management attributes from an administrator user through the user interface. That is to say, the administrator user can select a security group corresponding to a set of network resources 109 to which the client application 136 should have access. In addition, the administration user can specify device management attributes that are required in order for the access to the set of network resources 109 to be authorized. These attributes can include, for example, location of the client device 103, identity of the user, identity of the client device 103, application version, operating system version, jailbreak status, and other attributes. These configuration parameters are then sent to the network administration service 117.

At step 421, the network administration service 117 then configures the gateway 106 to provide the specified network access to the client application 136. In this regard, configuration settings in the gateway configuration data store 126 can be updated. Also, the network administration service 117 can cause the gateway 106 to perform various configuration functions relating to network address assignment. At step 424, the gateway 106 creates a VPN tunnel endpoint 125 for the client application 136.

At step 427, the gateway 106 creates network address assignment rules for the VPN tunnel endpoint 125. In particular, the gateway 106 determines a particular network address or predefined criteria for assigning network addresses that would enable the client application 136 to access the specified security group. Further, the gateway 106 creates rules that permit or deny access to the specified security group based on the MDM attributes of the client device 103 meeting or not meeting predefined criteria. In addition, a particular network address or predefined criteria for assigning network addresses that would enable the client application 136 to access a specified default network resource 109 can be determined for situations in which the client device 103 is non-compliant with respect to the MDM attributes.

Figure 5:
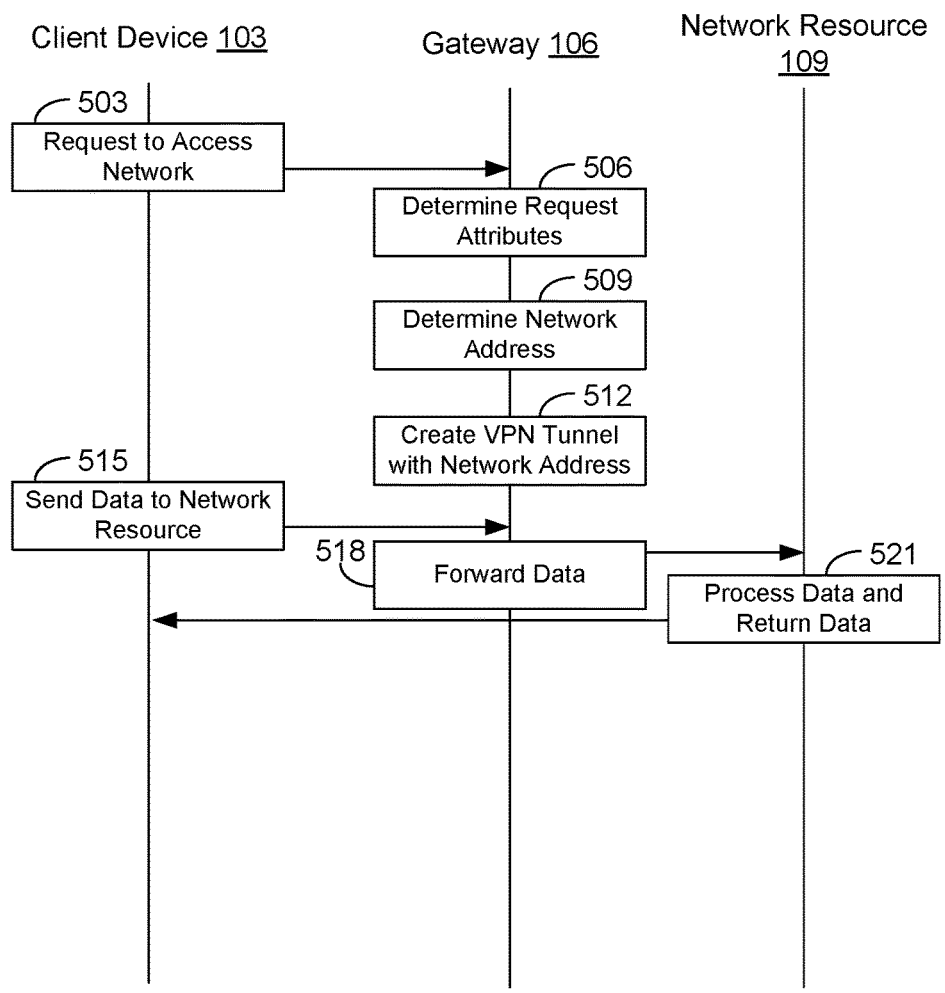

Turning now to FIG. 5, shown is a sequence diagram 500 illustrating one example of interaction between a client device 103, a gateway 106, and a network resource 109. Functionality attributed to each of the client device 103, the gateway 106, and the network resource 109 can be implemented in fewer processes or application or in additional processes or applications. The separation or segmentation of functionality as discussed herein is presented for illustrative purposes only.

Beginning with step 503, a client application 136 on a client device 103 requests to access a network resource 109 of the internal network 118. This request is sent from the client device 103 over the external network 121 to the gateway 106. At step 506, the gateway 106 determines attributes of the request such as, for example, application identifier, device identifier, user identifier, application version, operating system version, device location, jailbreak status, and other MDM attributes. At step 509, the gateway 106 determines a network address based on the client application 136 and/or one or more MDM attributes in order to provide access to a set of network resources 109 of a security group. For example, the gateway 106 can assign an IP address of "10.12.137.1" in order to access a particular set of network resources 109 for customer service representatives employed by the organization.

At step 512, the gateway 106 creates a VPN tunnel endpoint 125 having the network address. In some cases, a particular network address can be shared by several VPN tunnels. This can involve port address translation, where separate tunnels are assigned different port numbers with a single network address. At step 515, the client application 136 on the client device 103 sends data to a particular network resource 109. This data can be sent through a per-application VPN tunnel over the external network 121 to the VPN tunnel endpoint 125 in the gateway 106.

At step 518, the gateway 106 forwards the data to the network resource 109 over the internal network 118 using the assigned network address. In some cases, the gateway 106 can continually reevaluate the MDM attributes for compliance and forward in response to determining continued compliance. For example, if the location of the client device 103 is updated to an unauthorized location, a different network address can be assigned. Because the data is sent using the particular assigned network address, the routers, firewalls, switches, and/or other devices in the internal network 118 are configured to route the data to the network resource 109. At step 521, the network resource 109 processes the received data and returns other data back to the client device 103 by way of the gateway 106 and the VPN tunnel endpoint 125.

Figure 6:
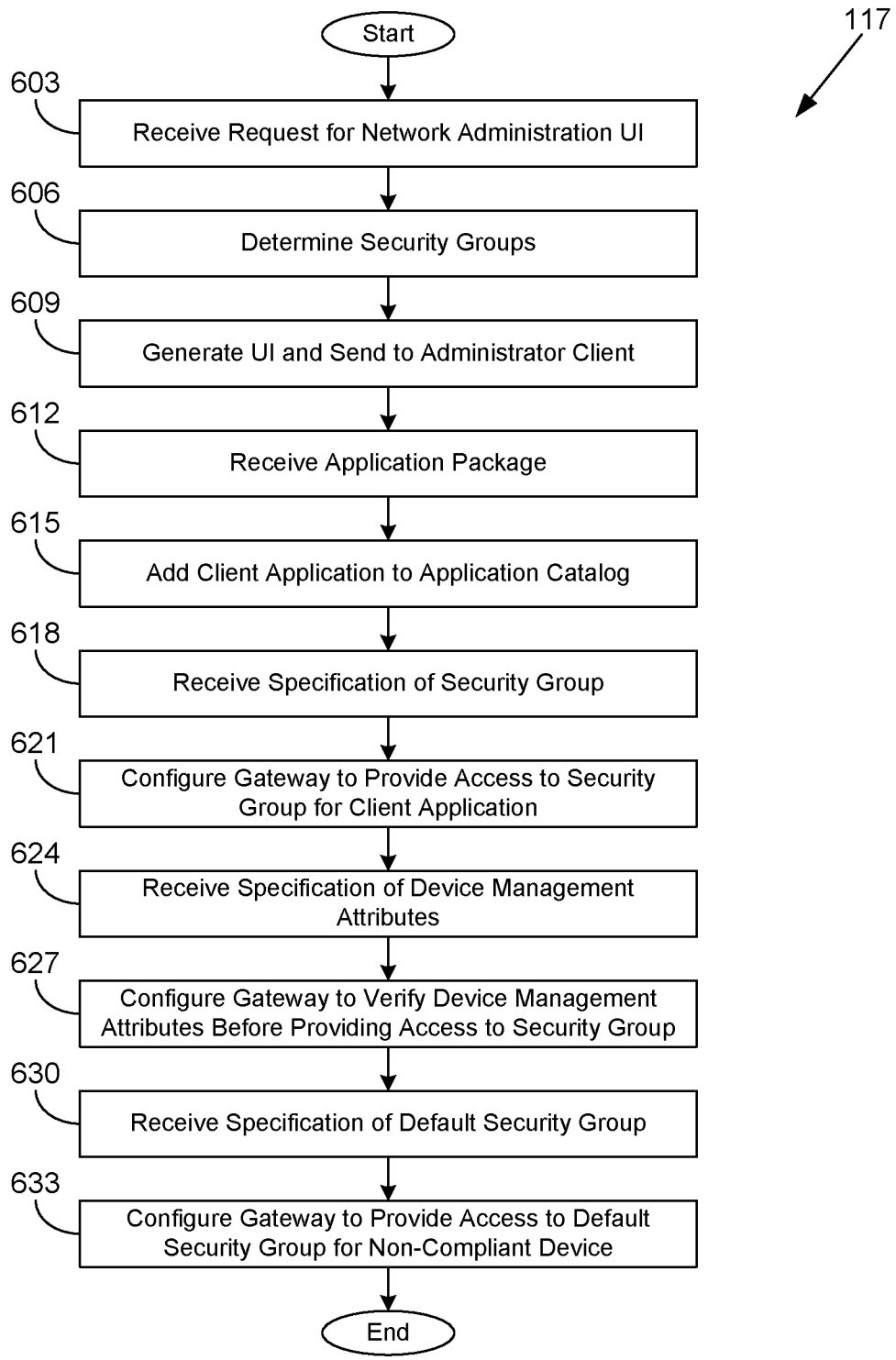
FIGS. 6 and 7 are flowcharts illustrating examples of functionality according to various examples of the present disclosure.

Turning now to FIG. 6, shown is a flowchart that provides one example of the operation of a network administration service 117. Functionality attributed to the network administration service 117 can be implemented in a single process or application or in multiple processes or applications. The separation or segmentation of functionality as discussed herein is presented for illustrative purposes only.

Beginning with step 603, the network administration service 117 receives a request for a network administration user interface from an administrator client device 105. At step 606, the network administration service 117 determines a mapping of security groups to network addresses that are available for the organization. The virtual network segments corresponding to these security groups can be preconfigured in the internal network 118 by the network controller 115. At step 609, the network administration service 117 generates the user interface and sends data encoding the user interface to the administrator client device 105.

At step 612, the network administration service 117 receives an application package uploaded by the administrator client device 105. Alternatively, the network administration service 117 receives a URL specified by the administrator client device 105 and can obtain the application package from another source. At step 615, the network administration service 117 adds the client application 136 to the application catalog of the organization.

At step 618, the network administration service 117 receives a specification of a security group from the administrator client device 105. The security group corresponds to a set of network resources 109 on the internal network 118 that the client application 136 should be permitted to access. The specification can correspond to a selection of one or more security groups from a listing of a plurality of security groups.

At step 621, the network administration service 117 configures the gateway 106 to provide access to the set of network resources 109 of the security group for the client application 136. In this regard, the network administration service 117 can determine a network address meeting predefined criteria that enables network traffic from the network address to be routed to a virtual network segment of the internal network 118, where the set of network resources 109 are accessible though the virtual network segment.

At step 624, the network administration service 117 receives a specification of one or more device management attributes from the administrator client device 105. The attributes can include device location, device identifier, user identifier, jailbreak status, operating system version, application version, and other attributes. The attributes can be required to be present (or absent) in order for a client device 103 to be considered to be in a compliant state. At step 627, the network administration service 117 configures the gateway 106 to verify the presence or compliance status of the attributes before providing a client application 136 with access to the corresponding security group.

At step 630, the network administration service 117 receives a specification of a default security group from the administrator client device 105. The default security group can correspond to a particular network resource 109 or set of network resources 109 for which a client application 136 that is considered non-compliant should have access. For example, if a client device 103 is non-compliant, it can be desirable not to have a network failure in response to the non-compliant status. Thus, the network traffic can failover to a network resource 109 that can provide an error message or error document to inform the end user of the lack of compliance. This can enable the end user to take steps to correct the condition leading to the lack of compliance. For example, a user can be instructed in a document from a default network resource 109 to exit a restricted area before access to a certain document is permitted.

At step 633, the network administration service 117 configures the gateway 106 to provide access to the default security group for non-compliant devices. To this end, the gateway 106 can be configured to assign a network address meeting different predefined criteria in order for the internal network 118 to route the network traffic from the client application 136 to the default network resource 109. Thereafter, the process can proceed to completion.

Figure 7:
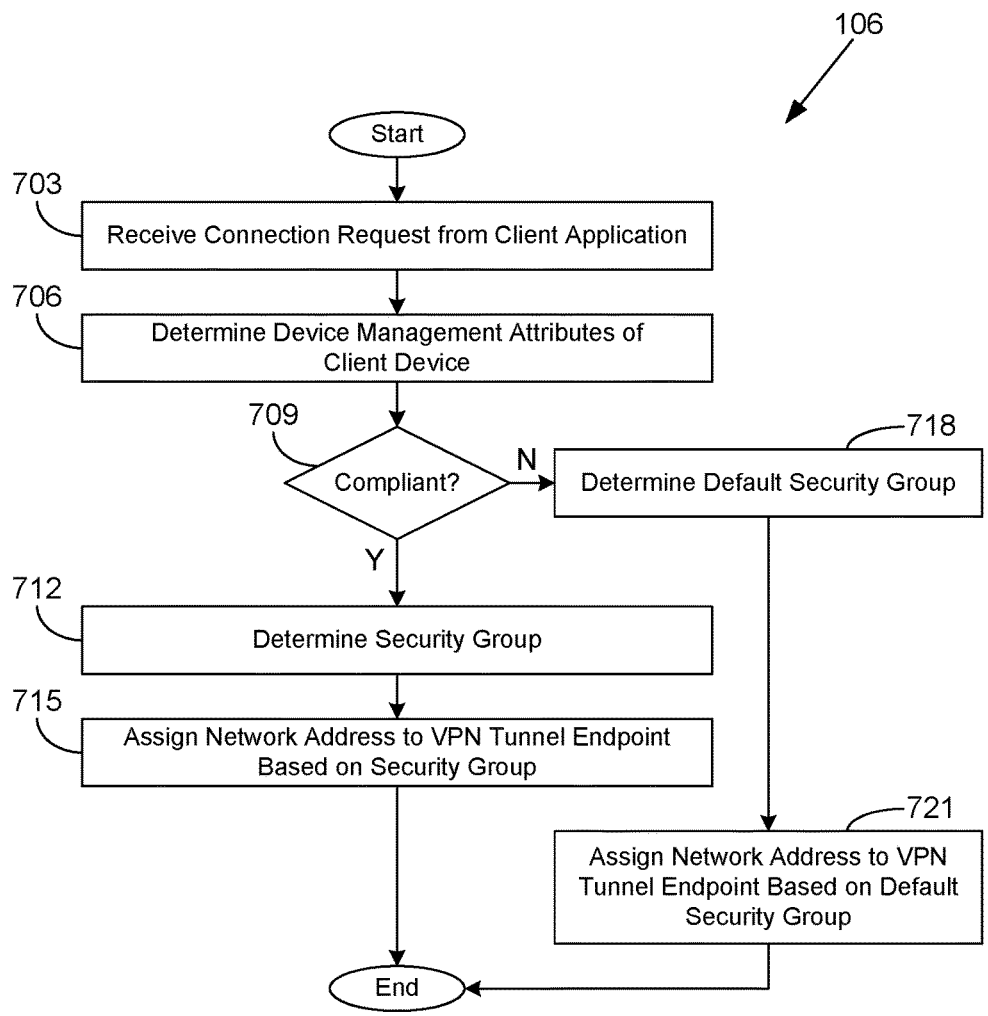

Continuing to FIG. 7, shown is a flowchart that provides one example of the operation of a gateway 106. Functionality attributed to the gateway 106 can be implemented in a single process or application or in multiple processes or applications. The separation or segmentation of functionality as discussed herein is presented for illustrative purposes only.

Beginning with step 703, the gateway 106 receives a connection request from a client application 136 executed by a client device 103. The connection request seeks to connect the client application 136 with one or more network resources 109 on the internal network 118. At step 706, the gateway 106 determines one or more device management characteristics of the client device 103. These characteristics can include user identifier, application identifier, location, device identifier, source IP address, destination IP address, source port number, destination port number, jailbreak status, and other characteristics.

At step 709, the gateway 106 evaluates the device management characteristics to determine whether the client device is associated with a compliant status and should be given access to a virtual network segment that includes the requested network resource 109. A variety of rules can be established in the gateway configuration data store 126 by the network administration service 117. If the client device 103 is compliant and the client application 136 should be permitted access, the gateway 106 continues to box 712 and determines a security group for the client application 136 according to rules in the gateway configuration data store 126. For example, the gateway configuration data store 126 can include a mapping of application identifiers to virtual network segment identifiers. This mapping can also include predefined criteria for assigning a network address such as an IP in order to provide access to the designated security group.

At step 715, the gateway 106 assigns a network address to a virtual private network (VPN) tunnel endpoint 125 for the connection, where the network address is assigned in order to provide access to the designated security group. For example, if a virtual network segment is accessible from an IP address range of "10.12.31.x," an IP address of "10.12.31.2" can be assigned to the VPN tunnel endpoint 125. Thereafter, the process can proceed to completion, and data can be exchanged between the client application 136 and the requested network resource 109.

Otherwise, if at step 709, it is determined that the client device 103 is in a non-compliant state, the gateway 106 can proceed to step 718. At step 718, the gateway 106 determines a default security group to which connections from non-compliant client devices 103 can be routed. At step 721, the gateway 106 assigns a network address to the VPN tunnel endpoint 125 for the connection, where the network address is assigned in order to provide access to the default security group. Thereafter, the process can proceed to completion, and default network resources 109 can be accessed by the client application 136 while the client device 103 is in a non-compliant state.

The flowcharts of FIGS. 6-7 and the sequence diagrams of FIGS. 4-5 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 103, the administrator client device 105, the gateway 106, the network controller 115, the network administration service 117, the network resources 109, the application catalog service 112, the device management service 104, or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the client device 103, the administrator client device 105, the gateway 106, the network controller 115, the network administration service 117, the network resources 109, the application catalog service 112, the device management service 104, and/or other components can be stored in one or more storage devices and be executable by one or more processors. Also, a data store can be stored in the one or more storage devices.

The client device 103, the administrator client device 105, the gateway 106, the network controller 115, the network administration service 117, the network resources 109, the application catalog service 112, the device management service 104, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying at least one program executable in at least one computing device, the at least one program, when executed by the at least one computing device, being configured to cause the at least one computing device to at least:
    determine a plurality of security groups for display on an administrator client based on security group data from a gateway data store, the security group data comprising a mapping of the security groups to a plurality of network address ranges for a plurality of virtual network segments in an internal network;
    display a user interface that is configured for uploading and configuring a particular application to be added to an application catalog, the user interface comprises an upload component for receiving a package containing the particular application and a selection component for specifying a subset of the plurality of security groups for the particular application;
    receive, from the administrator client, a specification of the subset of the plurality of security groups for the particular application executed in client devices on an external network, the subset of the security groups comprising: a compliant security group for compliant client devices, and a default security group for non-compliant client devices;
    configure a gateway that connects the external network to the internal network, the gateway being configured to permit the particular application to access network resources based on the subset of the security groups, wherein the compliant security group is associated with a first set of network resources, and the default security group is associated with a second set of network resources;
    establish a virtual private network tunnel with a client device based on an evaluation of compliance of the client device, wherein the evaluation is based on: at least one compliance rule, and device management attribute data received from the client devices;
    receive, from the administrator client, a specification of the at least one compliance rule that should be present on the client device on which the particular application is deployed in order to permit access to the first set of network resources; and
    configure the gateway to verify that the client device complies with the at least one device management attribute before permitting the virtual private network tunnel to be assigned to a virtual network segment that provides access to the first set of network resources.

2. The non-transitory computer-readable medium of claim 1, wherein the at least one device management attribute includes at least one of: a location of the client device, a user of the client device, an operating system of the client device, and a jailbreak status of the client device.

3. The non-transitory computer-readable medium of claim 1, wherein when executed the at least one program further causes the at least one computing device to at least:
    receive the package containing the particular application from the administrator client; and
    configure the application catalog to make the particular application available for deployment to the client devices.

4. A system, comprising:
    at least one computing device; and
    at least one program executable by the at least one computing device, the at least one program configured to cause the at least one computing device to at least:
        determine a plurality of security groups for display on an administrator client based on security group data from a gateway data store, the security group data comprises a mapping of the security groups to a plurality of network address ranges for a plurality of virtual network segments in an internal network;
        display a user interface that is configured for uploading and configuring a particular application to be added to an application catalog, the user interface comprises an upload component for receiving a package containing the particular application and a selection component for specifying a subset of the plurality of security groups for the particular application;

receive, from the administrator client, a specification of the subset of the plurality of security groups for the particular application executed in client devices on an external network, the subset of the security groups comprising: a compliant security group for compliant client devices, and a default security group for non-compliant client devices;

configure a gateway that connects the external network to the internal network, the gateway being configured to permit the particular application to access network resources based on the subset of the security groups, wherein the compliant security group is associated with a first set of network resources, and the default security group is associated with a second set of network resources;

establish a virtual private network tunnel with a client device based on an evaluation of compliance of the client device, wherein the evaluation is based on: at least one compliance rule, and device management attribute data received from the client device;

receive, from the administrator client, a specification of the at least one compliance rule that should be present on the client device on which the particular application is deployed in order to permit access to the first set of network resources; and configure the gateway to verify that the client device complies with the at least one device management attribute before permitting the virtual private network tunnel to be assigned to a virtual network segment that provides access to the first set of network resources.

5. The system of claim 4, wherein configuring the gateway further comprises configuring the gateway to assign a network address meeting predefined criteria to a tunnel endpoint associated with the particular application, wherein network traffic from network addresses meeting the predefined criteria is permitted to be forwarded to the first set of network resources by the internal network.

6. The system of claim 4, wherein the at least one device management attribute includes at least one of: a location of the client device, a user of the client device, an operating system of the client device, and a jailbreak status of the client device.

7. The system of claim 4, wherein when executed the at least one program is further configured to cause the at least one computing device to at least configure the gateway to route network traffic from the particular application on the client device to the virtual network segment comprising the second set of network resources in response to determining, based on the evaluation, that the client device is a non-compliant device.

8. The system of claim 7, wherein when executed the at least one program is further configured to cause the at least one computing device to at least receive a specification of the default network resource from the administrator client.

9. The system of claim 4, wherein the gateway includes an endpoint for the virtual private network tunnel through the external network to the client device upon which the particular application is executed, and upon configuration the gateway is configured to assign a particular network address to the endpoint, wherein the internal network is configured to route network traffic from the particular network address to the virtual network segment of the internal network through which the first set of network resources are accessible.

10. The system of claim 4, wherein the client devices are managed by an organization, and the internal network is operated by the organization.

11. The system of claim 4, wherein when executed the at least one program is further configured to cause the at least one computing device to at least:

receive a package containing the particular application from the administrator client; and configure an application catalog to make the particular application available for deployment to the client devices.

12. A method, comprising:

determining a plurality of security groups for display on an administrator client based on security group data from a gateway data store, the security group data comprising a mapping of the security groups to a plurality of network address ranges for a plurality of virtual network segments in an internal network;

displaying a user interface that is configured for uploading and configuring a particular application to be added to an application catalog, the user interface comprises an upload component for receiving a package containing the particular application and a selection component for specifying a subset of the plurality of security groups for the particular application;

receiving, from the administrator client, a specification of subset of the plurality of security groups for the particular application executed in client devices on an external network, the subset of the security groups comprising: a compliant security group for compliant client devices, and a default security group for non-compliant client devices;

configuring a gateway that connects the external network to the internal network, the gateway being configured to permit the particular application to access network resources based on the subset of the security groups, wherein the compliant security group is associated with a first set of network resources, and the default security group is associated with a second set of network resources;

establishing a virtual private network tunnel with a client device based on an evaluation of compliance of the client device, wherein the evaluation is based on: at least one compliance rule, and at least one device management attribute data received from the client devices;

receiving, from the administrator client, a specification of the at least one compliance rule that should be present on the client device on which the particular application is deployed in order to permit access to the first set of network resources; and configuring the gateway to verify that the client device complies with the at least one device management attribute before permitting the virtual private network tunnel to be assigned to a virtual network segment that provides access to the first set of network resources.

13. The method of claim 12, further comprising receiving a mapping of the first set of network resources to a predefined criteria from a network controller.

14. The method of claim 12, further comprising:

receiving a package containing the particular application from the administrator client; and configuring an application catalog to make the particular application available for deployment to the client devices.

15. The method of claim 12, wherein the at least one device management attribute includes at least one of: a location of the client device, a user of the client device, an operating system of the client device, and a jailbreak status of the client device.

16. The method of claim 12, further comprising:
configuring the gateway to assign a different virtual network segment in response to determining that the client device is non-compliant with the at least one device management attribute, wherein the different virtual network segment provides access to the second set of network resources.

* * * * *